United States Patent [19]

Normann

[11] Patent Number: 4,635,227
[45] Date of Patent: Jan. 6, 1987

[54] READING HEAD FOR THE MAGNETIC SCANNING OF ELONGATE BISTABLE MAGNETIC ELEMENTS

[75] Inventor: Norbert Normann, Pforzheim, Fed. Rep. of Germany

[73] Assignee: Doduco KG Dr. Eugen Durrwachter, Pforzheim, Fed. Rep. of Germany

[21] Appl. No.: 667,359

[22] Filed: Nov. 2, 1984

[30] Foreign Application Priority Data

Nov. 10, 1983 [DE] Fed. Rep. of Germany ....... 3340600

[51] Int. Cl.$^4$ ..................... G11C 11/00; G11B 5/02
[52] U.S. Cl. .................................. 365/133; 360/55; 360/122; 360/123; 360/125
[58] Field of Search ............. 360/125, 122, 123, 115, 360/124, 126, 89; 365/133

[56] References Cited

U.S. PATENT DOCUMENTS

| | | | |
|---|---|---|---|
| 2,428,449 | 10/1947 | Camras | 360/125 |
| 3,700,828 | 10/1972 | Zacaroli | 360/128 |
| 3,797,031 | 3/1974 | Hashimoto | 360/124 X |
| 3,895,002 | 7/1975 | Ridgway et al. | 360/124 X |
| 3,969,771 | 7/1976 | Suzuki et al. | 360/124 X |
| 4,593,209 | 6/1986 | Sloan | 360/110 |

FOREIGN PATENT DOCUMENTS

1173408  2/1959  France ................. 360/125

OTHER PUBLICATIONS

W. D. Kehr and F. B. Shelledy, Making Electromagnetic Shields Including Ferrite, vol. 15, No. 8, Jan. 1973.
L. F. Shew, Increased Density Magnetic Recording, vol. 2, No. 2, Aug. 1959.

Primary Examiner—Robert S. Tupper
Assistant Examiner—Andrew L. Sniezek
Attorney, Agent, or Firm—Balogh, Osann, Kramer, Dvorak, Genova & Traub

[57] ABSTRACT

The reading head comprises a core, which carries an electric detector winding and which may be E-shaped for reading two rows of Wiegand wires or U-shaped for reading one row of Wiegand wires. Two platelike permanent magnets are spaced from the outer legs of the core. One pole face of each permanent magnet is covered by a low-reluctance element, which terminates close to the core in a top plan view on the reading surface. The core and the magnets include such an oblique angle that in the reading surface of the reading head each low-reluctance element is spaced in the reading direction from the adjacent free leg end of the core. This arrangement ensures that during the reading operation each Wiegand wire will first enter the relatively extensive magnetic field established between those pole faces which are not covered by low-reluctance elements. Thereafter, the Wiegand wire is trigger and then enters the region between the low-reluctance elements and is saturated in that region. That concept permits the design of a reading head which has a short overall length and in which high signal amplitudes are obtained.

8 Claims, 6 Drawing Figures

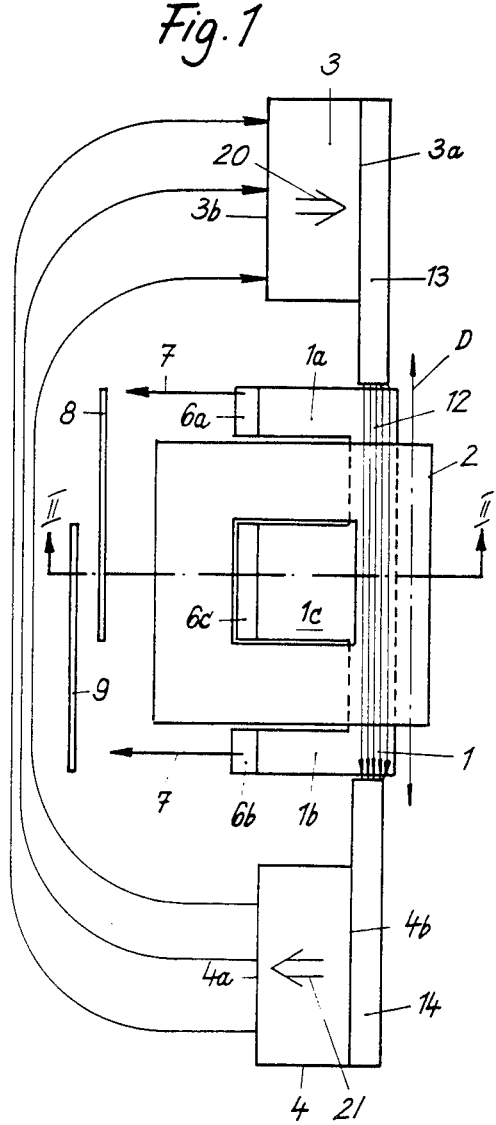
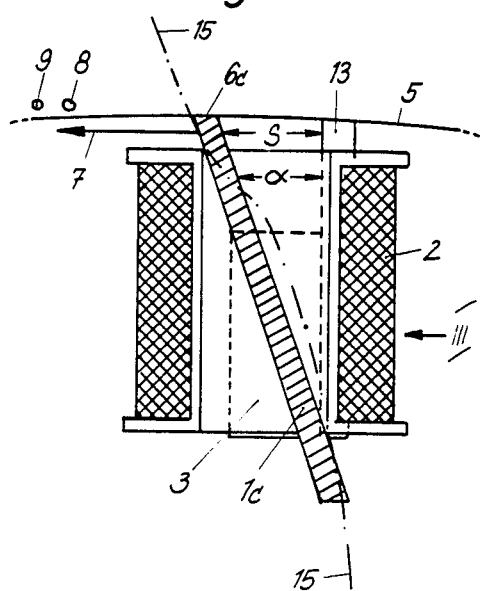

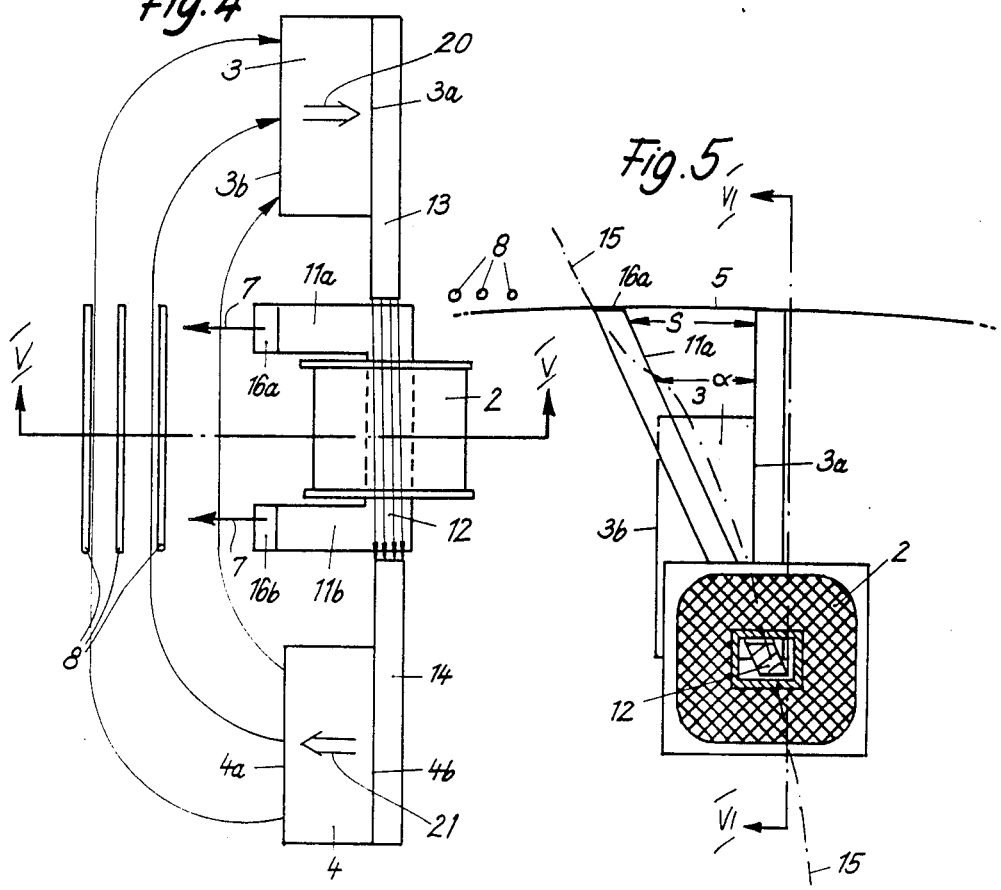
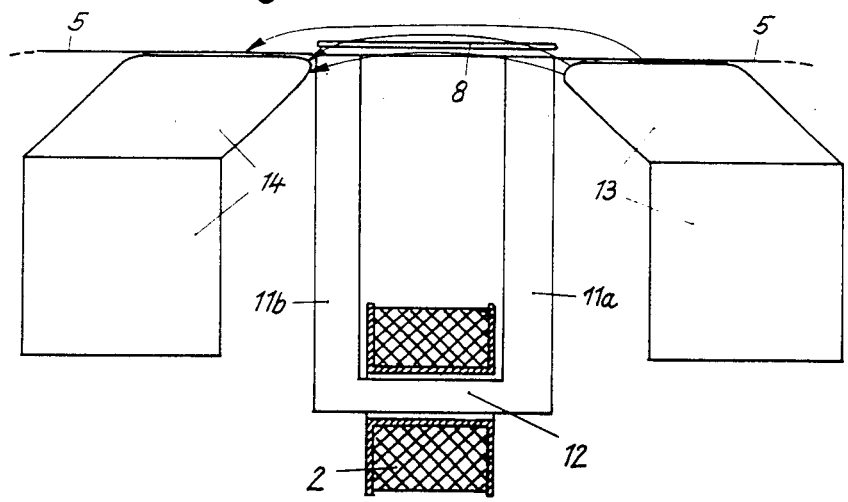

READING HEAD FOR THE MAGNETIC SCANNING OF ELONGATE BISTABLE MAGNETIC ELEMENTS

BACKGROUND OF THE INVENTION

1. Field of the Invention

This invention relates to a reading head for the magnetic scanning of two rows of juxtaposed parallel Wiegand wires or other elongate bistable magnetic elements, which reading head comprises an E-shaped soft magnetic core having three parallel legs, which have free ends disposed in the reading surface of the reading head and are connected at their opposite ends by a backbone spaced behind the reading surface of the reading head, and an electrically conductive detector winding surrounding the intermediate one of said legs, said reading head also comprising two short permanent magnets, which are spaced behind the reading surface and have relatively large pole faces and have the same flux density at said pole faces, one of said permanent magnets being spaced above the uppermost leg of the E-shaped core, and the other of said permanent magnets being spaced below the lower leg of the E-shaped core, said permanent magnets having a direction of magnetization which is approximately parallel to the reading surface of the reading head, said permanent magnets being so arranged that the magnetic field established between them has substantially antiparallel directions of flux which are approximately parallel to said backbone on opposite sides of said core.

2. Description of the Prior Art

Such reading head has been described in prior Laid-open German Application No. 32 23 924 and serves to read information which has been encoded in a pattern of Wiegand wires or similar bistable magnetic elements.

Wiegand wires are ferromagnetic wires which have a homogeneous composition and consist, e.g., of an iron-nickel alloy comprising preferably 48% iron and 52% nickel, or of an iron-cobalt alloy, or of a cobalt-nickle alloy, or of a cobalt-iron-vanadium alloy comprising preferably 52% cobalt, 38% iron and 10% vanadium, and which have been subjected to a special mechanical and thermal treatment resulting in the formation of said wires with a soft magnetic core and a hard magnetic shell, which has a higher coercive force than the core. Typical Wiegand wires have a length of 10 to 50 mm, preferably of 20 to 30 mm. When a Wiegand wire which has been magnetized to saturation in a magnetic field having a magnetic field strength of at least 80 A/cm and preferably in excess of 100 A/cm so that the soft magnetic core and the hard magnetic shell are magnetized in the same direction and said Wiegand wire is introduced into an external magnetic field which has the same direction as the axis of the wire and said direction is opposite to the direction of flux in the Wiegand wire, in the direction of flux in the soft core of the Wiegand wire will be reversed when the magnetic field strength of said external magnetic field exceeds a value of about 16 A/cm.

That reverasl can also be called resetting. When the magnetic field is reversed once more beyond a critical field strengh of the external magnetic field (that critical field strength is called the triggering field strength), the direction of the flux in the core will be reversed again so that the core and the shell will again have the same directions of flux. That reversal of the direction of flux takes place very quickly and is accomplished by a correspondingly large change of the magnetic flux per unit of time (Wiegand effect). That change of the magnetic flux can induce a short and very strong voltage pulse (Wiegand pulse) of up to about 12 volts in an induction winding, which is called detector winding and the number of turns and the load resistance of which will determine the induced voltage.

A pulse will also be generated in the detector winding when the core is reset but that pulse will have a much lower amplitude than the pulse generated during the reversal form the antiparallel to the parallel direction of flux in the wire and will have the opposite sign. If the Wiegand wire lies in a magnetic field which is reversed from time to time and which is so strong that it can reverse the magnetization first of the core and subsequently also of the shell and effect satuartion in each case, the reversal of the direction of flux in the soft magnetic core will result in the generation of Wiegand pulses of positive and negative polarities in alternation. This is described as a symmetrical exciation of the Wiegand wire. For this purpose field strengths from about $-(80$ to $120$ A/cm) to $+(80$ to $120$ A/cm) are required. The reversal of the direction of flux in the shell takes place also suddenly and results in a pulse in the detector winding but that pulse is much smaller than the pulse induced by the reversal of the direction of flux in the core.

If the external magnetic field can reverse only the direction of flux in the soft core but cannot reverse the direction of flux in the hard shell, the strong Wiegand pulses which are generated will have the same polarity. This result is described as a asymmetric excitation of the Wiegand wire. For this purpose a field strength of at least 16 A/cm is required in one direction (for resetting the Wiegand wire) and a field strength of about 80 to 120 A/cm is required in the opposite direction. It is typical of the Wiegand effect that the amplitude and width of the pulses which are generated are substantially independent of the rate of change of the external magnetic field and that they have a high signal-to-noise ratio.

The invention is also applicable to other bistable magnetic elements, which have two magnetically coupled regions which differ in hardness (coercive force), and like Wiegand wires can be used to generate pulses by an induced quick reversal of the direction of flux in the soft magnetic region. For instance, German Patent Specification No. 25 14 131 discloses a bistable magnetic element in the form of a wire having a hard magnetic core, e.g., of a nickle-cobalt alloy, an electrically conductive intermediate layer, e.g., of copper deposited on the core, and a surface layer, which has been deposited on said intermediate layer and consists of a soft-magnetic material, e.g., of a nickel-iron alloy. In another embodiment, the core consists of a magnetically non-conducting but electrically conducting metallic inner conductor, which has a high reluctance and consists, e.g., of a beryllium-copper alloy and on which first the hard magnetic layer, then the intermediate layer and finally the soft magnetic layer have been deposited. The pulses generated by such a bistable magnetic element will be smaller than those generated by a Wiegand wire.

Another bistable magnetic element consisting of two layers has been disclosed in the periodical ELEKTRONIK. 9, May 6, 1983, on pages 105 and 106.

Patterns of Wiegand wires can be used in binary encoding of information if two rows of parallel Wiegand wires are provided on a carrier in such a manner that the two rows are offset for each other in the longitudinal direction of the Wiegand wires and that each space between adjacent Wiegand wires of one row is in register with a Wiegand wire of the other row. If the carrier provided with the two rows of Wiegand wires is moved past a reading head or if a reading head is moved past the carrier in the longitudinal direction of the two rows, each Wiegand wire moving past the reading head will generate an electric pulse in a detector winding of the reading head. The reading head will distinguish between pulses generated by the Wiegand wires of the first and second rows and will associate the values "0" and "1", respectively, with said pulses.

The reading heads which are known for the purpose stated are intended foruse with Wiegand wires which are asymmetrically excited. In the reading head disclosed in Laid-open German Application No. 32 23 924 the electric detector winding surrounds an intermediate leg of an E-shaped core, which is divided by a nonmagnetic intermediate layer into two soft magnetic E-shaped core elements, which are parallel to each other.

In the prior art and within the scope of the invention the spacing of the three legs of the E-shaped cores, the length of the Wiegand wires provided in a carrier and the offset between the two rows of Wiegand wires provided in that carrier are so selected in view of each other that the two outer legs of the E-shaped core will be close to the outer ends of the Wiegand wires of the two rows thereof if the reading head is moved with the backbone of the E-shaped core in parallel to the Wiegand wires and the free ends of the legs of the E-shaped core face the Wiegand wires. In that case the intermediate leg will be close to the inner ends of the Wiegand wires of the two rows (see FIG. 1) and the short-time change of the magnetic flux which accompanies the reversl of the direction of flux of a Wiegand wire of one row and of a Wiegand wire of the other row will result in an induction of pulses having different polarities in the detector winding.

In the use of the known reading head the asymmetrical excitation of the Wiegand wires required for the generation of pulses is effected by means of two short permanent magnets, which are respectively disposed "above" the upper leg and "below" the lower leg of the E-shaped core and the normals on the pole faces of said permanent magnets include an angle between 60 and 80 degrees with the plane containing the three legs and the back of the E-shaped core and are parallel to the end faces of the three legs of the E-shaped core. (The words "above" and "below" relate to a vertical orientation of the Wiegand wires). As a result of the inclination of the permanent magnets, the magnetic fields established on the two sides of the E-shaped core have mutually opposite directions of flux and different strengths. the weaker of said fields is used for the magnetic resetting of the Wiegand wires and the field having the opposite flux direction is used to trigger the Wiegand wires. The two inclined permanent magnets magnetize the two E-shpaed core elements in mutuallly opposite directions so that the core elements constitute low-reluctance paths by which the magnetic flux is concentrated and confined at the free ends of their three leg. For the also required saturation in a magnetic field having the same flux direction as the magnetic field required for triggering, the known reading head comprises an additional permanent magnet, which is described as a saturating magnet and is spaced a few centimeters, typically 3 to 4 centimeters, from the E-shaped core so that the fields established by the saturating magnet and the other two magnets do not excessively weaken each other. The magnets are so arranged that the magnetic field for resetting the Wiegand wires is disposed between the magnetic fields for saturating and triggering the Wiegand wires, which latter two magnetic fields have directions of flux opposite to that of the resetting field and the latter is virtually confined by the two outer fields. As a result, the minimum field strength required for magnetically resetting the Wiegand wires is exceeded only in a region which is short in the reading direction. The length of that region could only be increased by an increase of the spacing of the magnets and of the overall length of the reading head.

A disadvantage of the known reading head resides in that it has anyway a larger overall length of at least 5 centimeters in the reading direction, which is the direction in which the reading head is moved past the Wiegand wires or the Wiegand wires are moved past the reading head, and that the reading had is susceptible to changes of the distance between the Wiegand wires and the reading head. Even changes of said distance by a few tenths of a millimeter may prevent a generation of Wiegand pulses. For this reason the known reading head is also susceptible to a canting of the reading head on an axis which is parallel to the backbone of the core. The permissible canting angle of the known reading head is very small.

Even a small canting of the reading head may prevent a generation of Wiegand pulses. That susceptibility of the known reading head to changes of its distance from the Wiegand wires and to a canting relative to the rows of Wiegand wires precludes the use of said reading head as a hand-held reading head, and the large overall length of that known reading head involves a relatively large reading movement. A large reading movement will be undesirable, e.g., when cards provided with encoded information in the form of patterns of Wiegand wires must be inserted into a slot of apparatus by which the cards are to be read. In that case the length of the card must exceed the length of the rows of Wiegand wires on the card at least by the overall length of the reading head.

Laid-open German Application No. 32 23 924 describes also a reading head for use with only one row of Wiegand wires. That reading head differs from the reading heads for use with two rows of Wiegand wires essentially only in that a U-shpaed core rather than the E-shaped core is used, the electric winding is carried by the backbone of the core, and the free leg ends of said core are disposed in the reading surface and face the ends of the Wiegand wires moved past the reading head. Such known reading heads have a U-shaped core have the same disadvantages as the above-described reading head having an E-shaped core.

The invention relates also to a reading head for the magnetic scanning of one row of juxtaposed parallel Wiegand wires or other elongate bistable magnetic elements, which reading head comprises a U-shaped soft magnetic core having two parallel legs, which have free ends disposed in the reading surface of the reading head and are connected at their opposite ends by a backbone disposed behind the reading surface of the reading head, and an electrically conductive detector winding surrounding said backbone, said reading head also comprising two short permanent magnets, which are spaced behind the reading surface and have relatively large pole faces and have the same flux density at said pole faces, one of said permanent magnets being spaced above the upper leg of said core and the other of said permanent magnets being spaced below the lower leg of said core, said permanent magnets having a direction of magnetization which is approximately parallel to the reading surface of the reading head, said permanent magnets being so arranged that the magnetic field established between them has substantially antiparallel directions of flux which are approximately parallel to said backbone on opposite side of said core.

SUMMARY OF THE INVENTION

It is an object of the invention to provide a compact reading head, which is of the kind described hereinbefore and has an E-shaped or U-shaped core and which is less susceptible to changes of its distance from the Wiegand wires or other bistable bimetallic elements to be read and to a canting of the reading head relative to the rows of said Wiegand wires or other bistable magnetic elements.

In a reading head described hereinbefore, for scanning Wiegand wires or other bistble magnetic elements, which reading head has an E-shaped core, that object is accomplished in that one of said permanent magnets carries a low-reluctance sheet metal element on its north pole face and the other permanent magnet carries a low-reluctance sheet metal element on its south pole face, said low-reluctance elements converge toward the terminate in the reading surface of the reading head so that their spacing in said reading surface, measured in the longitudinal direction of the backbone of the core, is approximately as large as the extent of said core in said direction, and the free end of each leg of the core has in said reading surface such a spacing from low-reluctance elements in the reading directions that the free end of said leg is disposed in or close to the neutral zone of the magnetic field.

In a reading head described hereinbefore, which serves to scan Wiegand wires or other bistable magnetic elements and has a U-shaped core, that object is accomplished in that one of said permanent magnets carries a low-reluctance sheet metal element on its north pole face and the other permanent magnet carrier a low-reluctance sheet metal element on its south pole face, said low-reluctance elements converge toward and terminate in the reading surface of the reading head so that their spacing in said reading surface, measured in the longitudinal direction of the backbone of the core, is approximately as large as the extent of said core in said direction, and the free end of each leg of the core has in said reading surface such a spacing from low-reluctance elements in the reading direction that the free end of said leg is disposed in or close to the neutral zone of the magnetic field.

Preferred features of the invention are recited in the dependent claims.

The advantages afforded by the invention will subsequently be explained with reference to a reading head having an E-shaped core but will also be afforded by a corresponding reading head having a U-shaped core.

Where the novel reading head is used, the two permanent magnets disposed near opposite end of the E-shaped core will establish at a location in front of the reading surface of the reading head a magnetic field having a field strength which is sufficient to saturate Wiegand wires, i.e., a field strength of at least 80 A/cm and to establish at a location which is close to said above-mentioned location a second magnetic field, in which the flux direction is opposite to that of the first mentioned magnetic field and which has a field strength that is sufficient to magnetically reset a Wiegand wire which had previously been saturated, i.e., a field strength of at least 16 A/cm. During the reading operation, the Wiegand wires are moved through said two locations. The reading surface of the reading head is the surface which contains the free ends of the three legs of the E-shaped core and past which the Wiegand wires are moved during the reading operation. The location at which the saturating field strength is reached or exceeded is in front of those edges of the low-reluctance elements which are disposed in the reading surface of the reading head and which constitute strong local magnetic poles there. Said local magnetic poles are so strong that the required saturating field strength in fornt of the reading surface of the reading head is reached not only in close proximity to that reading surface but also at a certain distance therefrom so that the reading head will not be succeptible in this respect to relatively small changes of the distance to the Wiegand wires.

The other location, where the resetting field strength is reached and exceeded, lies in the stray field of those two pole faces of the two permanent magnets which are not covered with low-reluctance elements and are spaced behind the reading surface of the reading head and are spaced somewhat from the upper and lower legs, respectively, of the E-shpaed core. Because the Wiegand wires and the reading head are so guided relative to each other during the reading operation that the ends of each Wiegand wire are moved past two adjacent legs of the E-shape dcore, as has been explained hereinbefore, each Wiegand wire moves through the strong local magnetic field in front of the low-reluctance elements but will be spaced a relatively large distance from those two pole faces which are not covered with low-reluctance elements. Owing to that relatively large spacing and because the magnetic field for effecting the magnetic resetting emanates from the relatively large pole faces which are not covered with low-reluctance elements the field strength required for resetting will be reached in a region which has a relatively large extent in the reading direction and changes of the distance from the Wiegand wires to the reading surface and any canting of the Wiegand wires relative to the reading direction will affect the reliability of the reading operation to a lower degree than in the prior art, in which the resetting field strength is reached only in a region which is rather short in the reading direction and lies between the oppositely directed magnetic fields for saturating and triggering the Wiegand wires.

During the reading operation the reading head in accordance with the invention is guided or the Wiegand wires are guided in such a manner that the Wiegand wires move first through the weaker magnetic filed, which serves to magnetically reset the Wiegand wires, and are subsequently moved past those edges of the low-reluctance element which are disposed in the reading surface of the reading head, and through in the strong magnetic field which emanates from said edges and serves to saturate the Wiegand wires. Each Wiegand wire is first magnetically reset and then passes through the zero field strength region of the succeeding magnetic field, which has the opposite direction of flux and has a field strength which steeply rises beyond said zero field strength region so that the Wiggand wire is triggered and is magnetized to magnetic saturation.

Because the Wiegand wire is saturated after it has been triggered, it is then ready for a subsequent magnetic resetting and triggering. If a Wiegand wire is not adequately saturated before it is reset or if it has been subjected before its resetting to an uncontrolled magnetic influence which has eliminated the previous staturation, that condition can be corrected in a simple manner in that the Wiegand wire which has not been correctly triggered during the first reading operation is moved once more past the reading head and that Wiegand wire will now be reliably triggered because it has been saturated in any case during the first reading operation, which was not satsifactory. Any missing Wiegand pulses in an encoded pulse train can be detected without difficulty by a testing circuit, which in that case may generate a signal indicating that the reading operation should be repeated.

Owing to the design of the reading head in accordance with the invention the overall length of the reading head in the reading direction can be reduced by 10 mm to 20 mm and a reliable triggering of the Wiegand wires will still be ensured if their distance from the reading surface increases to as much as 2 mm and/or the reading head is canted by an angle up to ±15° relative to the reading direction about an axis that is parallel to the backbone of the core. As a result, all requirements for a successful use of the reading head in hand-held readers have been met. When the reading head is used in stationary card readers the distinctly smaller overall length of the reading head will afford the advantage that the cards provided with Wiegand wires may be shorter or Wiegand wires arranged in a longer row may be provdied in a card having a given length so that the information content can be increased accordingly.

The materials for making the magnets used within the scope of the invention include alloys of rare earth elements with cobalt, particulary cobalt-samarium alloys, because very high magnetic flux densities can be produced by such materials.

In the reading head in accordance with the invention, the free ends of the legs of the E-shaped core are disposed in the near range of the neutral zone of the magnetic field established between the permanent magnets. (The near range of the neutral zone is defined as that region around the zero field strength located in which the magnetic field strength is still much lower than is required to saturate the soft magnetic material of the E-shaped core.) Because the Wiegand wires which have passed through that neutral zone are triggered by a relatively low field strength, also in the near range of the neutral zone, close to the free ends of the legs of the E-shaped core, the sudden change in magnetic flux resulting from the triggering of the Wiegand wire has a direct influence on the soft magnetic E-shaped core, by which the change in flux is coupled to the electric detector winding provided on the intermediate leg of the E-shaped core. It will be understood that the change in flux resulting from the triggering of the Wiegand wire will be most effectively coupled to the detector winding if the free ends of the legs of the E-shaped core are disposed exactly at that location in the reading surface of the reading head in front of which the Wiegand wires are triggered.

The pulse amplitude which can be obtained in the detector winding can be substantially increased if the E-shaped core is arranged in such an oblique position in the reading head that the entire core rather than only its portions disposed in the reading surface is disposed in or close to the neutral zone of the magnetic field, i.e., in a region in which the field strength is very low. Such an arrangment will be desirable because it avoids a staturation of the E-shaped core under the influence of the permanent magnets so that the high permeability of the core is preserved. In accordance with the prior art the E-shaped core is disposed in a region which contains strong stray fields and is partly saturated by said stray fields so that it is less responsive to further changes in flux. In the prior art it was also necessary to divide the core into two core elements by a nonmagnetic intermediate layer because the core was permeated by magnetic fields having mutually opposite directions. Such nonmagnetic intermediate layer is not required in the core of the reading head in accordance with the invention.

The low-reluctance elements and the E-shaped core may be so shaped that the neutral zone of the magnetic field accomodates the entire magnetic core. In the practice of the invention it will be sufficient, however, to approximate ideal conditions by a suitable orientation and association of an E-shaped core bounded by planar surfaces relative to the permanent magnets, which are defined by parallel pole faces, which are aligned in pairs and carry planar low-reluctance sheet metal elements. The use of components having planar surfaces will facilitate the design of the reading head. Different from the prior art the pole faces of the magnets are suitably at right angles to the reading direction so that the E-shaped core includes with the reading direction an angle which differs from 90°. The reading direction is at right angles to the straight line which connects the free ends of the legs of the E-shaped core and is parallel or tangential to the reading surface of the reading head at that location.

BRIEF DESCRIPTION OF THE DRAWING

FIG. 1 is a top plan view on the reading surface of a reading head having an E-shaped core.

FIG. 2 is a sectional view taken on line II—II of FIG. 1.

FIGS. 4 to 6 are views corresponding to FIGS. 1 to 3, respectively, and show a reading head having a U-shaped rather than an E-shaped core.

DESCRIPTION OF THE PRFERRED EMBODIMENTS

Figure 3:
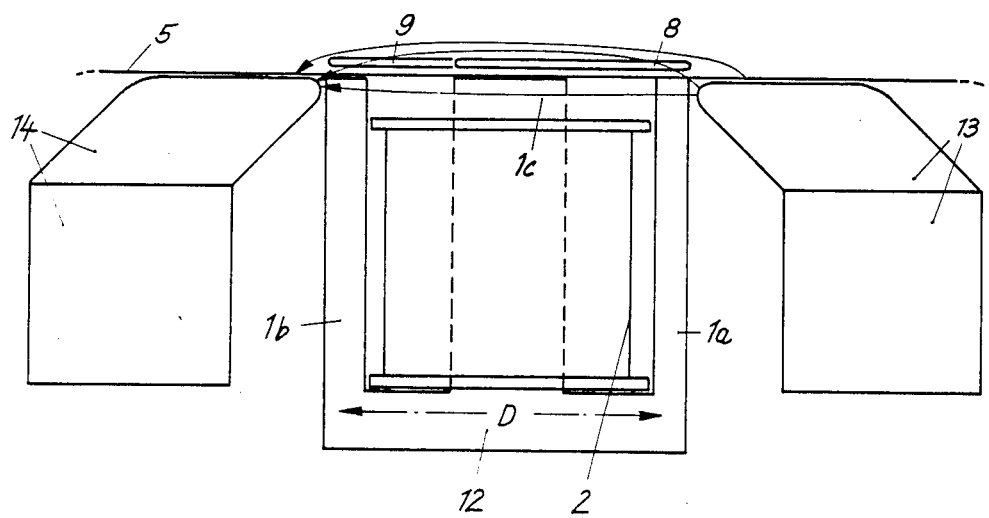
FIG. 3 is a side elevation of the reading head shown in FIGS. 1 and 2 and viewed in the direction of the arrow III in FIG. 2.

Illustrative embodiments of the invention are diagrammatically shown on the accompanying drawings and will now be described. In the drawings, identical or corresponding parts are designed by the same reference numerals.

The reading head shown in FIGS. 1 to 3 comprises a housing, not shown, which accommodates a soft magnetic E-shaped core 1 having an intermediate leg 1c, which is surrounded by an electric detector winding 2. The housing also contains two short plate-like permanent magnets 3 and 4 having relatively large pole faces. The entire arrangement consisting of the core 1, winding 2 and magnets 3 is embedded in a body of plastic material, particularly cast resin, so that the location of the components relative to each other and to the housing is permanently fixed. For the sake of clearness, the plastic body is not shown. In FIGS. 2 and 3, however, the reading surface 5 of the reading head is indicated. That reading surface 5 is defined by a surface of the plastic body and contains the free ends 6a, 6b, and 6c of the three legs 1a, 1b and 1c of the E-shaped core 1. The legs 1a and 1b are known as upper and lower legs, respectively.

The two magnets 3 and 4 have the same size and the same flux density at their pole faces 3a, 3b and 4a, 4b, which are at right angles to the reading direction 7. The reading direction 7 is that direction in which the reading head is moved during the reading operation relative to the Wiegand wires 8 and 9, which are assumed to be stationary. The straight line which connects the free ends 6a, 6b and 6c of the three legs of the E-shaped core 1 is also at right angles to the reading direction. As is most clearly apparent from FIG. 2, however, the E-shaped core as a whole is not at right angles to the reading direction 7 but the two planes defined by the two side faces of the E-shaped core 1 include with the reading direction an angle $\alpha$ differing from 90°. The free ends 6a, 6b and 6c of the three legs of the E-shaped core 1 have bevelled end faces, which are flush with the reading surface 5.

The two permanent magnets 3 and 4 are spaced behind the reading surface 5 and in a direction D which is at right angles to the reading direction 7 are spaced from the legs 1a and 1b of the E-shaped core 1. The arrangement is such that when the E-shaped core is viewed in a direction which is parallel to the reading surface 5 and at right angles to the reading direction 7 the three legs 1a to 1c of the E-shaped core 1 cross the two magnets 3 and 4 approximately diagonally (see FIG. 2).

The two magnets 3 and 4 have antiparallel flux directions 20, 21 and each of them carriers on one pole face 3a or 4b a low-reluctance sheet metal element 13 or 14. Those pole faces 3a and 4b of the two magnets which carry the low-reluctance elements have opposite signs and are aligned with each other. The planar low-reluctance elements 13 and 14 cover the associated pole faces 3a and 4b entirely and each of them extends from that edge of the associated magnet 3 or 4 which is nearest to the reading surface 5 as far as to the reading surface 5 of the reading head and when viewed in a top plan view on the reading surface, as in FIG. 1, approaches the adjacent one of the two outer legs 1a and 1b of the E-shaped core but terminates at a small distance therefrom. As a result, that end of each of the low-reluctance elements 13 and 14 which lies in the reading surface 5 is close to the free end 6a or 6b of the adjacent leg of the E-shaped core 1 in a side elevation (FIG. 3) but is spaced a substantial distance from that free leg end in the reading direction 7 (see FIG. 2).

In the embodiment shown, the longitudinal axis of the detector winding 2 is at right angles to the reading surface 5 and includes with the intermediate leg 1c of the E-shaped core an angle which differs from zero. That orientation of the winding 2 is not essential. The orientation of the electric winding 2 is no part of the invention and a different orientation may be selected.

The reading head shown in FIGS. 1 to 3 serves to read information which is encoded in two rows of Wiegand wires. Two Wiegand wires 8 and 9 of respective rows are shown by way of example. The length of the Wiegand wires 8 and 9 and the locations of the free ends 6a, 6b and 6c of the legs of the E-shaped core 1 are so selected that the ends of the Wiegand wires 8 of one row will move past the free leg ends 6a and 6c and the ends of the Wiegand wires 9 of the other row will move past the free leg ends 6c and 6b of the E-shaped core 1 when the reading head is moved along the rows of Wiegand wires in the reading direction, which is transverse to the Wiegand wires 8 and 9.

During the reading operation each Wiegand wire which has previously been magnetically saturated first enters the relatively large extended magnetic field which is established between the two pole faces 3b and 4a and causes the Wiegand wire to be magnetically reset. Adjacent to the free leg ends 6a and 6c or 6b and 6c the Wiegand wire 8 or 9 passes through a zero field strength region 15 and then enters that region in which the magnetic field established between the pole faces 3a and 4b, which are covered by low-reluctance elements 13 and 14, has a steeply increasing field strength beyond the zero field strength region. Shortly after moving through the zero field strength region 15 the Wiegand wire 8 or 9 is triggered and adjacent to the low-reluctance element 13 or 14 is magnetized to saturation. The Wiegand wire 8 or 9 which has been triggered and has subsequently been saturated is then ready for another reading operation.

The triggering of the Wiegand wire results in a sudden change in magnetic flux and this results in a sudden change of the magnetization of the E-shaped core 1 so that an electric pulse is induced in the winding 2. The polarity of that pulse will depend on whether the just triggered Wiegand wire has been removed past the legs 1a and 1c or past the legs 1b or 1c.

Owing to the oblique orientation of the E-shaped core relative to the two permanent magnets 3 and 4 and owing to the special arrangement of the low-reluctance elements 13 and 14, the entire E-shaped core 1 is accommodated in a region 15 in which the magnetic field strength is relatively low. As a result, the changes in magnetic flux resulting from the triggering of the Wiegand wires are coupled to a substantially unsaturated core and for this reason produce high signal amplitudes.

The illustrative embodiment shown in FIGS. 4 to 6 differs from the embodiment shown in FIGS. 1 to 3 only in that the E-shaped core 1 has been replaced by an U-shaped core 11, which on its backbone 12 carries the required electric detector winding 2. Such reading head serves to read information which is encoded in a single row of Wiegand wires 8. The free ends 16a and 17a of the two legs 11a and 11b of the U-shaped core 11 lie again in the reading surface 5 of the reading head and the spacing of said legs is so matched to the length of the Wiegand wires 8 that the ends of the Wiegand wires will move past the free leg ends 16a and 16b of the core 11 during the reading operation, when the reading is moved at right angles to the Wiegand wires along the row thereof.

The pulses induced in such reading head will have only one polarity. In other respects, the conditions are the same as those explained with reference to FIGS. 1 to 3.

What is claimed is:

1. In a reading head for the magnetic scanning of a pluarity of juxtaposed elongated bistable magnetic elements arranged in two parallel rows, cmprising
    means defining a reading surface,
    an E-shaped soft magnetic core which comprises an elongated backbone defining a longitudinal direction thereof, an upper leg, a lower leg, and an intermediate leg between them, which legs are in parallel and protruding from said backbone and terminate with their respective free leg ends in said reading surface, whereas the backbone is spaced from said reading surface, an electrically conductive detector winding surrounding said intermediate leg, and two short permanent magnets having large north and south pole faces, the same magnetic flux density at their pole faces and a direction of magnetization which is approximately parallel to said reading surface, one of the magnets being spaced upwardly from the upper leg and the other magnet being spaced below the lower leg of said E-shaped core, said permanent magnets being arranged to establish between them a magnetic field which on opposite sides of said core has antiparallel flux components which are approximately parallel to said backbone and are separated by a neutral zone, the improvement residing in that two low-reluctance sheet metal elements are respectively carried by the north poleface of one of said permanent magnets and by the south poleface of the other of said permanent magnets, said low-reluctance elements converge toward and terminate in said reading surface where they are spaced apart by a distance which slightly exceeds the length of said core, said free leg ends have in said reading surface such a spacing from said low-reluctance elements in a direction which is transverse to the longitudinal direction of said backbone that said free leg ends are disposed in the vicinity of the neutral zone of said magnetic field.

2. The improvement set forth in claim 1, wherein said core is so arranged relative to said two permanent magnets and said low-reluctance elements that the entire core is disposed in or close to said neutral zone of said magnetic field.

3. The improvement set forth in claim 1, wherein said permanent magnets are platelike and have planar pole faces, said north pole face of each of said permanent magnets is aligned with said south pole face of the other of said permanent magnets, said low-reluctance elements are planar and inlcude an angle with said core differing from 0°, and said backbone is approximately flush with those of said pole faces which are provided with said low-reluctance elements.

4. The improvement set forth in claim 1, wherein said pole faces are planar and extend in the longitudinal direction of said backbone.

5. In a reading head for the magnetic scanning of a plurality of juxtaposed elongated bistable magnetic elements arranged in a row, comprising means defining a reading surface, an U-shaped soft magnetic core, which comprises an elongated backbone defining a longitudinal direction thereof, and two parallel legs which protrude from said backbone and terminate with their respective free leg ends in said reading surface, whereas the backbone is spaced from said reading surface, an electric detector winding surrounding said backbone, and two short permanent magnets having large north and south pole faces and the same magnetic flux density at said pole faces, and a direction of magnetization which is approximately parallel to said reading surface, the magnets being spaced in the longitudinal direction of said backbone from each other and from the core which is disposed between the two magnets, said permanent magnets being arranged to establish between them a magnetic field which on opposite sides of said core has antiparallel flux components which are approximately parallel to said backbone and are separated by a neutral zone, the improvement residing in that two low-reluctance sheet metal elements are respectively carrier by the north poleface of one of said permanent magnets and by the south poleface of the other of said permanent magnets, said low-reluctance elements converge toward and terminate in said reading surface where they are spaced apart by a distance which slightly exceeds the length of said core, said free leg ends have in said reading surface such a spacing from said low-reluctance elements in a direction which is transverse to the longitudinal direction of said backbone that said free leg ends are disposed in the vicinity of the neutral zone of said magnetic field.

6. The improvement set forth in claim 5, wherein said core is so arranged relative to said two permanent magnets and said low-reluctance elements that the entire core is disposed in or close to said neutral zone of said magnetic field.

7. The improvement set forth in claim 5, wherein said permanent magnets are platelike and have planar pole faces, said north pole face of each of said permanent magnets is aligned with said south pole face of the other of said permanent magnets, said low-reluctance elements are planar and include an angle $\alpha$ with said core differing from 0°, and said backbone is approximately flush with those of said pole faces which are provided with said low-reluctance elements.

8. The improvement set forth in claim 5, wherein said pole faces are planar and extend in the longitudinal direction of said backbone.

* * * * *